United States Patent [19]

Yun

[11] Patent Number: 5,595,656

[45] Date of Patent: Jan. 21, 1997

[54] DEVICE FOR FILTERING AGRICULTURAL WATER

[76] Inventor: Chang H. Yun, 138-2, Guseo-Dong, Gumjung-Gu, Pusan, Rep. of Korea

[21] Appl. No.: 514,790

[22] Filed: Aug. 14, 1995

[30] Foreign Application Priority Data

Aug. 17, 1994 [KR] Rep. of Korea .................... 94-20913

[51] Int. Cl.⁶ .................................................. B01D 35/02
[52] U.S. Cl. ........................ 210/416.1; 210/436; 210/446; 210/448; 210/90; 210/313
[58] Field of Search ..................................... 210/446, 432, 210/435, 436, 312, 313, 448, 416.1, 90

[56] References Cited

U.S. PATENT DOCUMENTS 4,609,459  9/1986  Hendrix ................................... 210/445
5,024,249  6/1991  Botsolas .
5,269,913  12/1993  Atkins ..................................... 210/445

*Primary Examiner*—Robert J. Popovics
*Attorney, Agent, or Firm*—Banner & Witcoff, Ltd.

[57] ABSTRACT

Disclosed is a device 10 for filtering agricultural water. At least one protruding part 44 is formed on the circumferential surface of a lower shell 20 in a manner that radially projects and axially extends; the inner surface of the protruding part 44 provides a particulate matter accommodating chamber 46; an exhaust port 38 is formed in the lower end of the lower shell 20, the exhaust port 38 being communicated with the particulate matter accommodating chamber 46; and a valve 40 is provided in the exhaust port 38.

5 Claims, 3 Drawing Sheets

DEVICE FOR FILTERING AGRICULTURAL WATER

BACKGROUND OF THE INVENTION

1. Field of the Invention

The present invention relates to a device for filtering agricultural water. More particularly, the present invention relates to a device for filtering agricultural water in which a space for accommodating particulate matters being filtered is increased whereby water supplying properties of the device can be improved, and by which the particulate matters can be discharged from the device in a simple and convenient manner without the disassembly thereof whereby water supplying operation can be continuously carried out without shutdown, and time and cost needed to disassemble the device and clear the particulate matters can be saved.

2. Description of the Prior Art

An agricultural water filtering device is used for filtering particulate matters, such as sands, contained in agricultural water supplied to a farm produce in a vinyl plastic hothouse, etc. A typical agricultural water filtering device according to the prior art includes an inlet tube and an outlet tube, and a filtering part is provided between the inlet tube and the outlet tube. The filtering part has two shells. An upper shell is disposed between the inlet tube and the outlet tube to connect them each other, and is downwardly projected from a common axis of the inlet tube and the outlet tube. The upper end of a lower shell is threaded into the lower end of the upper shell. A plurality of filters are received in the inner space defined by the upper shell and the lower shell to filter agricultural water. The agricultural water pumped by a water pump flows into the device through the inlet tube, and after filtered by the filter, flows out through the outlet tube to a water spraying device such as a sprinkler or a spray nozzle.

However, in the agricultural water filtering device constructed as mentioned above, since the space in which the particulate matters being filtered are accommodated is so small that the device had to be frequently disassembled to clear the particulate matters, water supplying properties of the device are deteriorated. Also, since the special means for discharging the particulate matters is not provided in the device, when the particulate matters are needed to be cleared, the lower shell has to be detached from the upper shell, by which water supplying operation is frequently interrupted and much time and cost are wasted in disassembling the device and clearing the particulate matters. These problems are very serious in a farm of large scale, and if the disassembling and clearing operation is not performed in a proper time, the filtering efficiency of the filter is decreased to cause a trouble in the water supplying operation.

SUMMARY OF THE INVENTION

Accordingly, the present invention has been made in view of the above-described problems occurring in the prior art, and an object of the present invention is to provide a device for filtering agricultural water in which a space for accommodating particulate matters being filtered is increased to improve the water supplying properties of the device.

Another object of the present invention is to provide the device for filtering agricultural water by which the particulate matters can be discharged from the device in a simple and convenient manner without the disassembly thereof to make water supplying operation be continuously carried out without shutdown and to save the time and cost needed to disassemble the device and clear the particulate matters.

According to one aspect of the present invention, there is provided a device for filtering agricultural water, said device comprising:

an inlet tube connected to a water pump;

an outlet tube connected to a spray nozzle;

an upper shell disposed between the inlet tube and the outlet tube to connect them each other and downwardly projected from a common axis of the inlet tube and the outlet tube;

a lower shell detachably fastened to the lower end of the upper shell and having at least one protruding part which is formed on the circumferential surface thereof in a manner that radially projects and axially extends whereby the inner surface of the protruding part provides a particulate matter accommodating chamber; and at least one filter received in the inner space defined by the upper shell and the lower shell to filter the agricultural water.

By the above feature of the present invention, as the inner surface of the protruding part provides a particulate matter accommodating chamber, a space for accommodating particulate matters being filtered is increased to improve the water supplying properties of the device.

According to another aspect of the present invention, an exhaust port is formed in the lower end of the lower shell, the exhaust port being communicated with the particulate matter accommodating chamber; and a valve is provided in the exhaust port.

By the above feature of the present invention, the particulate matters can be discharged from the device in a simple and convenient manner without the disassembly thereof to make water supplying operation be continuously carried out without shutdown and to save the time and cost needed to disassemble the device and clear the particulate matters.

BRIEF DESCRIPTION OF THE DRAWINGS

The above object, and other features and advantages of the present invention will be more apparent after a reading of the following detailed description taken in conjunction with the drawings, in which.

DETAILED DESCRIPTION OF THE PREFERRED EMBODIMENT

Hereinafter, a device for filtering agricultural water in accordance with an embodiment the present invention will be described with reference to the drawings.

Figure 1:
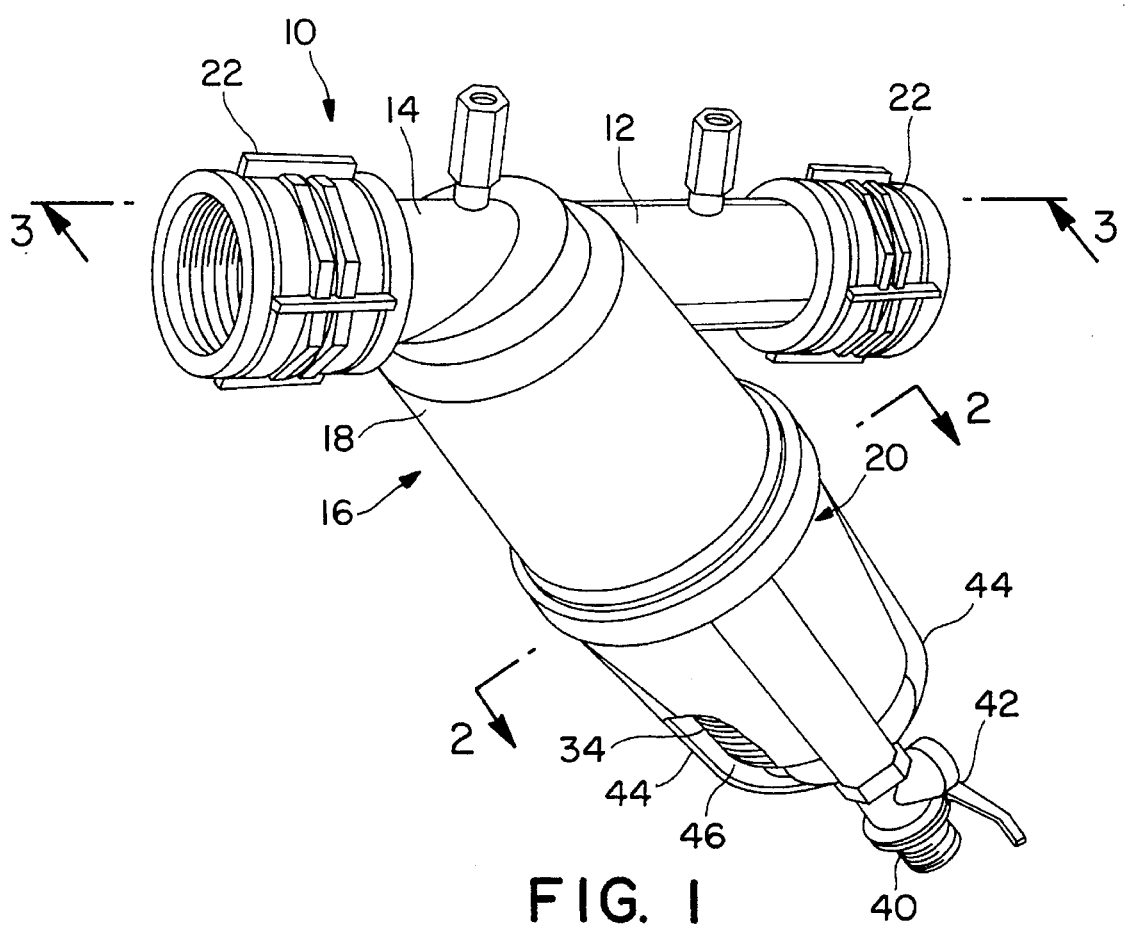
FIG. 1 is a partially-broken away perspective view of a device for filtering agricultural water in accordance with an embodiment of the present invention.
Figure 2:
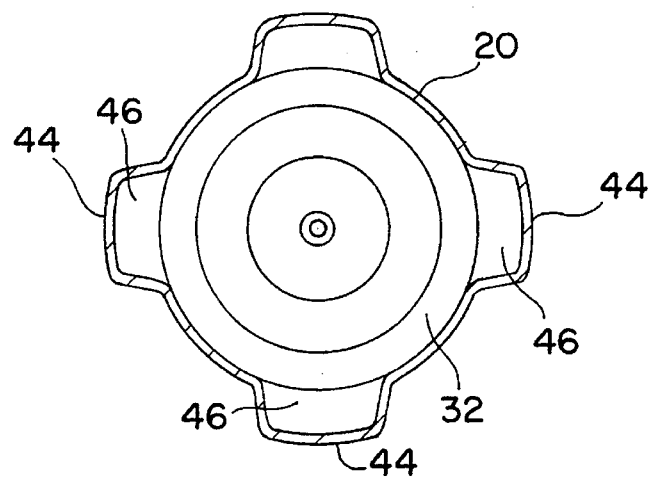
FIG. 2 is a sectional view taken along the line A—A of FIG. 1.
Figure 4:
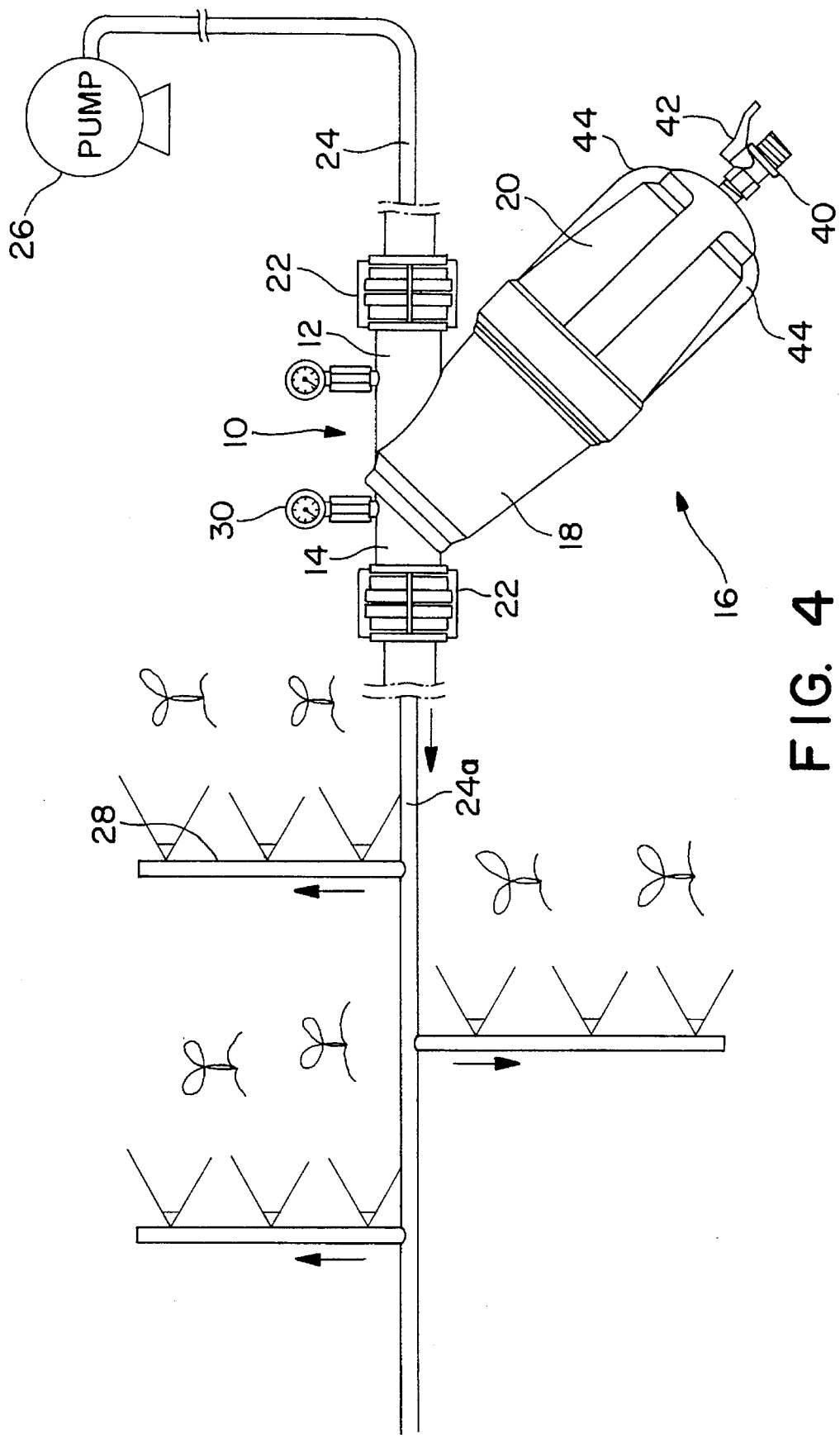
FIG. 4 is a perspective view illustrating the device for filtering agricultural water used in a field.

FIG. 1 is a partially-broken away perspective view of a device for filtering agricultural water in accordance with an embodiment of the present invention. As shown in FIG. 1, a device for filtering agricultural water 10 includes an inlet tube 12, an outlet tube 14, and a filtering part 16 provided between the inlet tube 12 and the outlet tube 14. Referring now to FIG. 4, the inlet tube 12 is connected to a water pump 26 through a pipe 24, and the outlet tube 14 is connected to a water spraying device such as a sprinkler or a spray nozzle 28 through a pipe 24a. The pipes 24 and 24a are locked to the inlet tube 12 and the outlet tube 14 by a socket 22, respectively. A pressure gauge 30 is mounted to the respective inlet tube 12 and the outlet tube 14 to indicate the water pressure inside each tube 12 and 14.

The filtering part 16 has two shell 18 and 20. An upper shell 18 connects the inlet tube 12 with the outlet tube 14 and is downwardly projected from a common axis of the inlet tube 12 and the outlet tube 14. The upper end of a lower shell 20 is threaded onto the lower end of the upper shell 18. A filtering chamber 32 is defined inside the upper shell 18 and the lower shell 20, and a plurality of filters 34 are disposed in the filtering chamber 32. Each filter 34 functions to filter agricultural water entering filtering chamber 32 through the inlet tube 12, and the agricultural water filtered by the filter 34 is discharged through the outlet tube 14.

According to the present invention, four protruding parts 44 are formed on the circumferential surface of the lower shell 20 providing particulate matter collecting chambers that protrude from the surface of the shell, and the protruding parts 44 are spaced apart from each other along the circumferential surface of the lower shell 20. Each protruding part 44 projects radially and extends axially. Inside each protruding part 44 is defined a particulate matter accommodating chamber 46 into which particulate matter filtered by the filter 34 can be accommodated. By the fact that the inner surface of the protruding part 44 provides the particulate matter accommodating chamber 46, a space for accommodating particulate matters being filtered is increased to improve the water supplying properties of the device.

Figure 3:
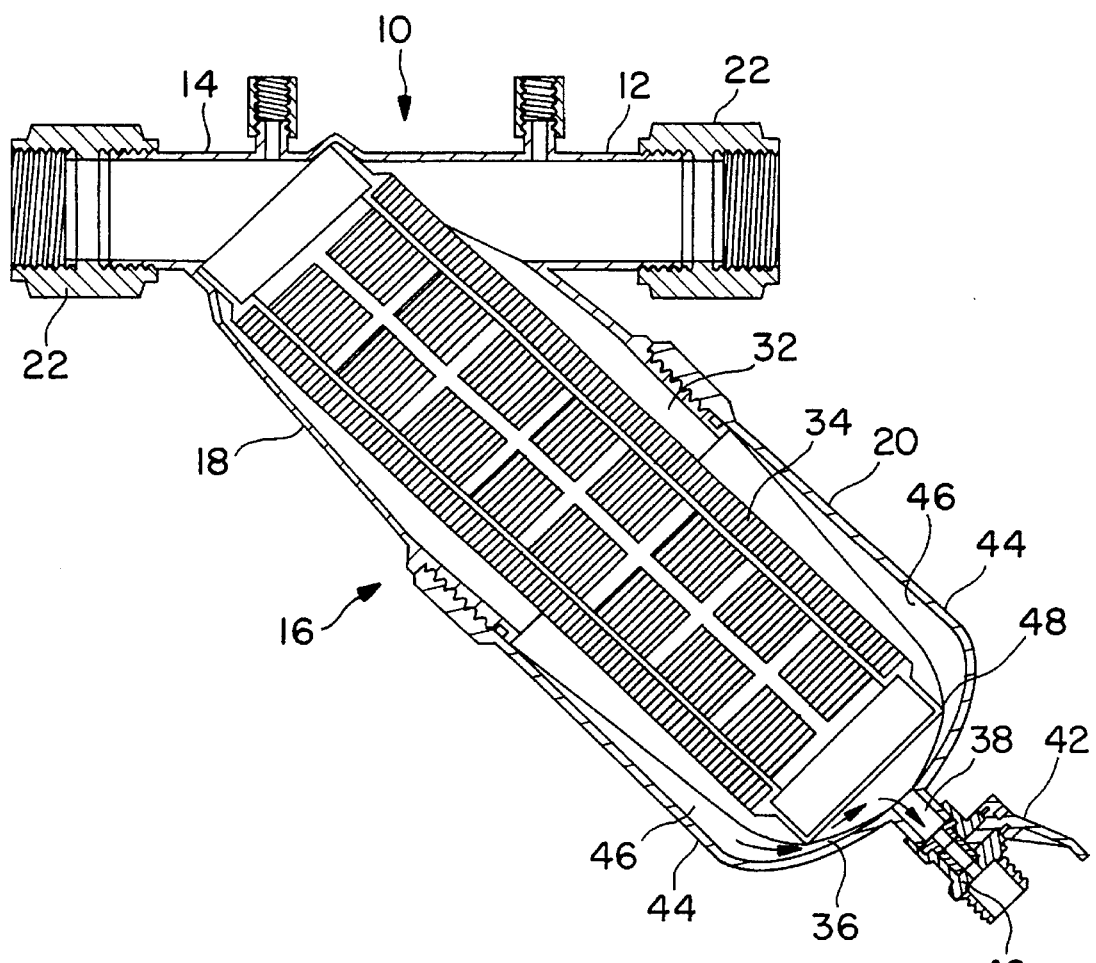
FIG. 3 is a sectional view taken along the line B—B of FIG. 1.

Also, as best shown in FIG. 3, the lower end of the filter 34 is seated onto a filter seating surface 48 which is defined by the inner surface portion of the lower end of the lower shell 20 which is not formed with the protruding part 44, and an exhaust port 38 is formed in the lower end surface of the lower shell 20. The lower end of the particulate matter accommodating chamber 46 defines a particulate matter outlet passage 36, and the particulate matter outlet passage 36 is communicated with the exhaust port 38. In the exhaust port 38 is provided a valve 40, and the valve 40 is actuated by a knob 42. When the valve 40 is opened by the actuation of the knob 42, the particulate matters accommodated in the particulate matter accommodating chamber 46 can be discharged outside the device through the exhaust port 38 via the particulate matter outlet passage 36. Therefore, the particulate matters can be discharged from the device in a simple and convenient manner without the disassembly thereof to make water supplying operation be continuously carried out without shutdown and to save the time and cost needed to disassemble the device and clear the particulate matters.

As described above, according to the present invention, as the inner surface of the protruding part provides a particulate matter accommodating chamber, a space for accommodating particulate matters being filtered is increased to improve the water supplying properties of the device. Also, the particulate matters can be discharged from the device in a simple and convenient manner without the disassembly thereof to make water supplying operation be continuously carried out without shutdown and to save the time and cost needed to disassemble the device and clear the particulate matters.

Although the present invention has been described and illustrated with reference to the preferred embodiment, it is to be readily understood that the present invention is not limited to the preferred embodiment, and various changes and modifications can be made without departing from the scope and spirit of the invention defined in the appended claims.

What is claimed is:

1. A device for filtering agricultural water comprising:

an inlet tube connected to a water pump;

an outlet tube connected to a spray nozzle;

an upper shell disposed between said inlet tube and said outlet tube to connect them to each other, said upper shell being downwardly projected from a common axis of said inlet tube and said outlet tube;

a lower shell detachably fastened to a lower end of said upper shell and having at least one protruding portion formed on a circumferential surface of said lower shell, said protruding portion projecting radially and extending axially such that an inner surface of said protruding portion define, a particulate matter containment chamber; and at least one filter received in an inner space defined by said upper shell and said lower shell to filter the agricultural water and thereby deposit any particulate matter in said containment chamber.

2. The device for filtering agricultural water as claimed in claim 1, further comprising an exhaust port is formed in a lower end of said lower shell, said exhaust port being in fluid communication with said particulate matter containment chamber; and a valve provided in said exhaust port.

3. A device for filtering water and separating particulate matter from the water, said device comprising:

an inlet connected to a water pump;

an outlet connected to a nozzle; and a filtration apparatus disposed between said inlet and said outlet, said filtration apparatus comprising an upper shell portion connecting said inlet to said outlet, a lower shell portion detachably fastened to said upper shell portion, a filter chamber defined in said lower shell portion housing at least one filter therein, said lower shell portion also including at least one particulate matter containment chamber formed integrally on said lower shell portion, and an exhaust valve in fluid communication with said containment chamber for eliminating collected particulate matter.

4. The device of claim 3, wherein said containment chamber is formed as a radial protrusion on a circumferential surface of said lower shell portion.

5. The device of claim 3, further comprising a release knob connected to said exhaust valve for opening said valve and eliminating collected particulate matter easily during operation of the device.

* * * * *